US012761592B2

(12) United States Patent
Miyamoto et al.

(10) Patent No.: US 12,761,592 B2
(45) Date of Patent: Oct. 13, 2026

(54) FIXING DEVICE AND IMAGE FORMING APPARATUS

(71) Applicant: CANON KABUSHIKI KAISHA, Tokyo (JP)

(72) Inventors: Hiroshi Miyamoto, Saitama (JP); Akiyoshi Shinagawa, Saitama (JP); Suguru Takeuchi, Chiba (JP); Kengo Koyama, Chiba (JP); Yasuharu Toratani, Chiba (JP); Ayano Saito, Chiba (JP); Kiyonori Sotome, Ibaraki (JP); Masaki Suda, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/209,978

(22) Filed: May 16, 2025

(65) Prior Publication Data

US 2025/0377618 A1 Dec. 11, 2025

(30) Foreign Application Priority Data

Jun. 11, 2024 (JP) ................................ 2024-094067

(51) Int. Cl.
*G03G 15/20* (2006.01)

(52) U.S. Cl.
CPC ..... *G03G 15/2053* (2013.01); *G03G 15/2039* (2013.01); *G03G 2215/2025* (2013.01)

(58) Field of Classification Search
CPC ........... G03G 15/2053; G03G 15/2039; G03G 2215/2025
See application file for complete search history.

(56) References Cited

U.S. PATENT DOCUMENTS

| | | | | | |
|---|---|---|---|---|---|
| 9,244,408 | B2 | 1/2016 | Inoue et al. | | |
| 2007/0212093 | A1* | 9/2007 | Maeda | G03G 15/2039 | 399/70 |
| 2009/0092424 | A1* | 4/2009 | Kim | G03G 15/2064 | 399/329 |
| 2011/0135341 | A1* | 6/2011 | Kamiya | G03G 21/1685 | 399/329 |
| 2011/0142469 | A1* | 6/2011 | Nakatsuhara | G03G 15/2028 | 399/329 |

(Continued)

FOREIGN PATENT DOCUMENTS

| | | | | |
|---|---|---|---|---|
| JP | 2001125405 | A | * | 5/2001 |
| JP | 2007233236 | A | * | 9/2007 |

(Continued)

*Primary Examiner* — Sevan A Aydin
(74) *Attorney, Agent, or Firm* — Venable LLP

(57) ABSTRACT

A fixing device for fixing a toner image on a recording material includes an endless belt, a rotatable member to form a nip, first and second stretching rollers in contact with an inner peripheral surface of the belt, and first and second heaters to heat the first and second stretching rollers, respectively. An amount of heat generation of the first heater is larger than an amount of heat generation of the second heater. At a start up of the fixing device, heating of the first heater is started by a first electric power prior to heating of the second heater, and the heating of the second heater is started by a second electric power smaller than the first electric power after a temperature of the first stretching member reaches a target temperature.

15 Claims, 7 Drawing Sheets

(56) References Cited

U.S. PATENT DOCUMENTS

| | | | | |
|---|---|---|---|---|
| 2013/0251419 | A1* | 9/2013 | Kimura | G03G 15/2053 399/329 |
| 2014/0064803 | A1* | 3/2014 | Okabayashi | G03G 15/2064 399/329 |
| 2017/0277088 | A1* | 9/2017 | Wu | G03G 15/2017 |
| 2019/0302665 | A1* | 10/2019 | Yada | G03G 15/2039 |
| 2021/0149329 | A1* | 5/2021 | Harada | G03G 15/2042 |
| 2022/0171315 | A1* | 6/2022 | Matsuda | G03G 15/2064 |
| 2023/0280682 | A1* | 9/2023 | Matsuda | G03G 15/2053 399/69 |

FOREIGN PATENT DOCUMENTS

| | | | |
|---|---|---|---|
| JP | 2013156334 | A | 8/2013 |
| JP | 2014228765 | A | 12/2014 |

* cited by examiner

FIXING DEVICE AND IMAGE FORMING APPARATUS

BACKGROUND

Field of the Technology

The present invention relates to a fixing device which heats a toner image which is born on a recording material and fixes the toner image on the recording material, and it relates to an image forming apparatus which is provided with the fixing device, such as a copier, a printer, a fax machine, and a multifunction printer which includes a plurality of these functions.

Description of the Related Art

Conventionally, the image forming apparatus includes the fixing device which fixes the toner image which is born on the recording material to the recording material. As a fixing device, a configuration, which includes an endless belt member, a plurality of stretching members which stretch the belt member, a heater which heats the stretching members, and a rotatable member which forms a nip portion with the belt member, and which conveys the toner image on the recording material while heating the toner image in the nip portion, is disclosed in Japanese Laid-Open Patent Application (JP-A) 2013-156334 and Japanese Laid-Open Patent Application (JP-A) 2014-228765.

Further, in JP-A 2013-156334, a configuration, which includes a heating roller which contacts an inner peripheral surface or an outer peripheral surface of the belt member and a pad member which is disposed to nip the belt member with a rotatable member on an inside of the belt member and forms the nip portion between the belt member and the rotatable member, and is provided with the heater which heats the heating roller and the pad member, respectively, is disclosed.

In the configuration of JP-A 2013-156334, heating of a heater which heats the pad member in which a heat capacity is larger than the heating roller and temperature rising rate of the belt member is slower than the heating roller is started first, since the belt member, which is heated by the heating roller in which heat capacity is smaller than the pad member, may be melted, when the heaters of the heating roller and the pad member are started simultaneously at a start up of the fixing device, and each of them is heated until it reaches a target temperature.

SUMMARY

A principal object of the present invention is to provide a fixing device for heating a toner image born on a recording material and fixing to the recording material, the fixing device comprising: an endless belt member; a rotatable member configured to form a nip portion, between itself and the belt member, for nipping and conveying the recording material in contact with an outer peripheral surface of the belt member; a first stretching member in contact with an inner peripheral surface or the outer peripheral surface of the belt member and configured to stretch the belt member; a first heater configured to heat the first stretching member; a second stretching member in contact with the inner peripheral surface or the outer peripheral surface of the belt member and configured to stretch the belt member; and a second heater configured to heat the second stretching member, wherein an amount of heat generation of the first heater is larger than an amount of heat generation of the second heater, and wherein at a start up of the fixing device, heating of the first heater is started by a first electric power prior to heating of the second heater, and the heating of the second heater is started by a second electric power smaller than the first electric power after a temperature of the first stretching member reaches a target temperature.

Further features of the present invention will become apparent from the following description of exemplary embodiments with reference to the attached drawings.

DESCRIPTION OF THE EMBODIMENTS

Figure 1:
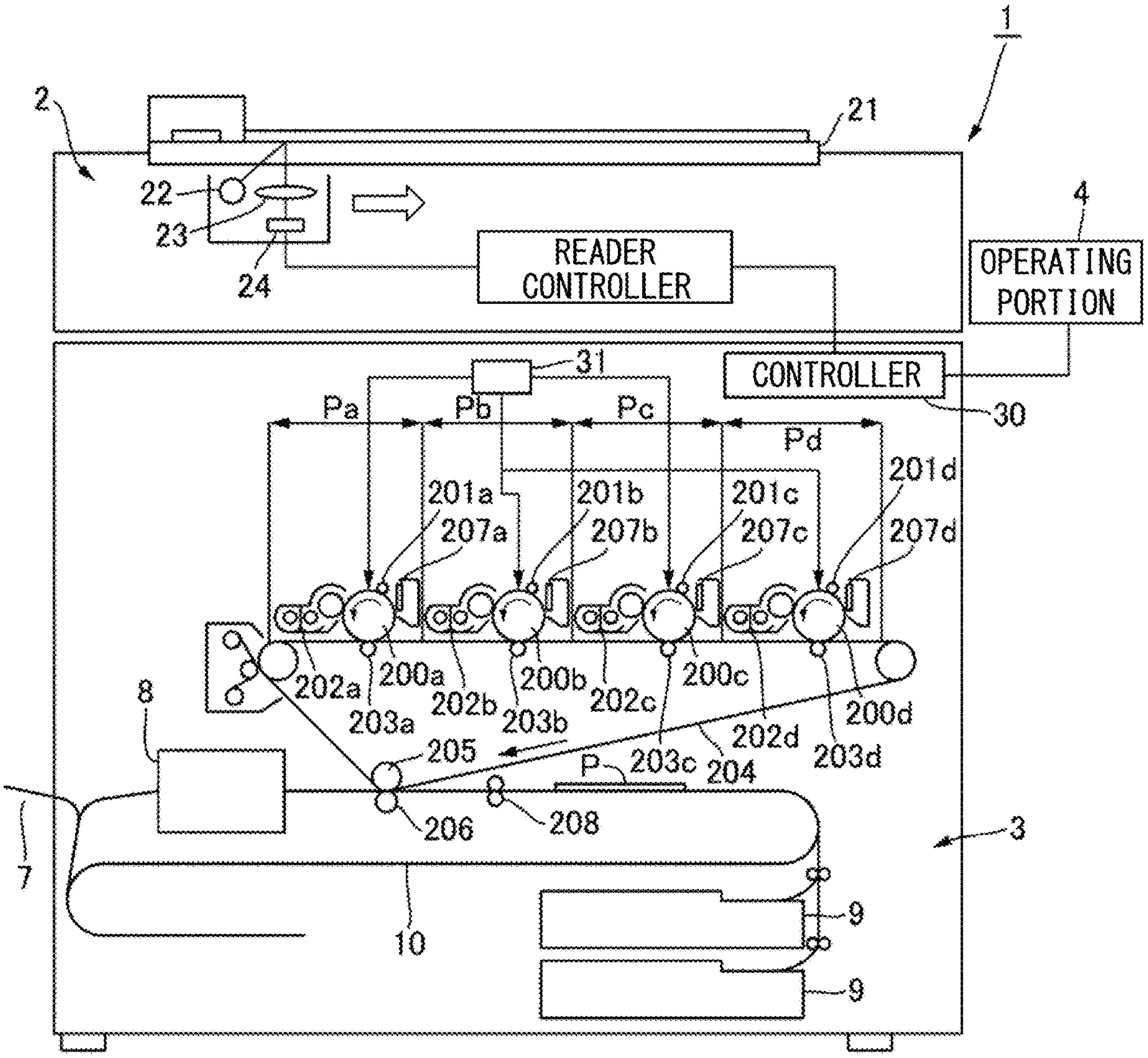
FIG. 1 is a schematic configuration of a sectional view of an image forming apparatus according to an embodiment.

In the following, an embodiment of the present invention will be described with reference to FIG. 1 through FIG. 6. First, a schematic configuration of the image forming apparatus according to the present embodiment will be described with reference to FIG. 1.

[Image Forming Apparatus]

An image forming apparatus 1 is an electrophotographic full-color printer, which includes four image forming portions Pa, Pb, Pc and Pd which are provided corresponding to four colors which are yellow, magenta, cyan and black. In the embodiment, the image forming apparatus is a tandem type in which the image forming portions Pa, Pb, Pc and Pd are disposed along a rotational direction of an intermediary transfer belt 204 which will be described below. The image forming apparatus 1 forms a toner image (image) on a recording material in accordance with an image signal from an image reading portion (original reading device) 2 which is connected to an image forming apparatus main assembly 3 or from a host device such as a personal computer which is communicably connected to the image forming apparatus main assembly 3. Sheet material such as paper, plastic film and cloth may be used as the recording material.

The image forming apparatus 1 is provided with the image reading portion 2 and the image forming apparatus main assembly 3. In the image reading portion 2 which reads an original which is placed on an original supporting platen glass 21, light which is irradiated from a light source 22 is reflected on the original and is formed into an image on a CCD sensor 24 via an optical component 23 such as a lens. Such an optical unit converts the original into an electrical signal data line of each line by scanning in a direction of a hollow arrow. The image signal which is obtained by the CCD sensor 24 is sent to the image forming apparatus main assembly 3, and image processing with accordance with each image forming portion which will be described below is performed by a control portion 30. Further, the control portion 30 also receives an external input from an external host device such as a print server as an image signal.

The image forming apparatus main assembly 3 is provided with a plurality of image forming portions Pa, Pb, Pc and Pd, and image forming is performed based on the image signal which is described above in each image forming portion. That is, the image signal is converted into a laser beam in which the control portion 30 controls by PWM (Pulse Width Modulation). A polygon scanner 31 as an exposure device scans a laser beam in accordance with the image signal. And the laser beam is irradiated onto photosensitive drums 200*a* to 200*d* as image bearing members of each image forming portion Pa to Pd.

Incidentally, Pa is a yellow (Y) image forming portion, Pb is a magenta (M) image forming portion, Pc is a cyan (C) image forming portion and Pd is a black (Bk) image forming portion, and each of the image forming portions forms an image of the corresponding color. Since the image forming portions Pa to Pd are substantially identical, the image forming portion Pa of Y will be specifically described below and the descriptions of the other image forming portions will be omitted. In the image forming portion Pa, a toner image is formed on a surface of the photosensitive drum 200*a* according to the image signal as will be described below.

A charging roller 201*a* as a primary charging device charges a surface of the photosensitive drum 200*a* to a predetermined potential and prepares to form an electrostatic latent image. The electrostatic latent image is formed on the surface of the photosensitive drum 200*a*, which is charged to the predetermined potential by a laser beam from the polygon scanner 31. A developing device 202*a* develops the electrostatic latent image on the photosensitive drum 200*a* and forms a toner image. A first transfer roller 203*a* applies a first transfer bias whose polarity is opposite to the toner by discharging from a rear side of the intermediary transfer belt 204 and transfers the toner image on the photosensitive drum 200*a* to the intermediary transfer belt 204. After transfer, the photosensitive drum 200*a* is cleaned by a cleaner 207*a*.

Further, the toner image on the intermediary transfer belt 204 is conveyed to a next image forming portion, and the toner image of each color which is formed sequentially in each of the image forming portions in an order of Y, M, C and Bk is transferred, and the image of four color is formed on the surface. And the toner image which is passed through the image forming portion Pd of Bk which is located in a most downstream position with respect to a rotational direction of the intermediary transfer belt 204 is conveyed to a secondary transfer portion which is configured of a secondary transfer roller pair 205 and 206. And in the secondary transfer portion, the toner image on the intermediary transfer belt 204 is transferred to the recording material P when a secondary transfer electric field whose polarity is opposite to the toner image is applied.

The recording material P is accommodated in a cassette 9, and the recording material P which is fed from the cassette 9 is conveyed to a registration portion 208 which is configured of a pair of registration rollers, for example, and standbys at the registration portion 208. After that, a timing control of the registration portion 208 is performed to match a position of the toner image on the intermediary transfer belt 204 and a position of the recording material P, and the recording material is conveyed to the secondary transfer portion.

The recording material P, to which the toner image is transferred in the secondary transfer portion, is conveyed to a fixing device 8, and the toner image which is borne on the recording material P is fixed to the recording material P when the toner image is heated and pressed in the fixing device 8. The recording material P which is passed through the fixing device 8 is discharged to a discharge tray 7. Incidentally, in a case of forming images on both sides of the recording material P, after transferring and fixing the toner image to a first side surface (front side surface) of the recording material P are completed, the recording material P is reversed through a reversing conveying portion 10, and transferring and fixing the toner image to a second side surface (back side surface) of the recording material P are performed, and the recording material P is stacked on the discharge tray 7.

Incidentally, the control portion 30 controls a whole of the image forming apparatus 1 as described above. Further, the control portion 30 is capable of performing various settings, etc., based on an input from an operation portion 4 in which the image forming apparatus 1 includes. The control portion 30 includes a CPU (Central Processing Unit) 30*a*, a ROM (Read Only Memory) 30*b*, and a RAM (Random Access Memory) 30*c* (see FIG. 6 which will be described below). The CPU 30*a* reads a program which corresponds to a control procedure which is stored in the ROM 30*b* and performs control of each portion. Further, the RAM 30*c* stores working data and input data, and the CPU 30*a* performs control by referring to the data which is stored in the RAM 30*c* based on the program, which is described above, etc.

[Fixing Device]

Figure 2:
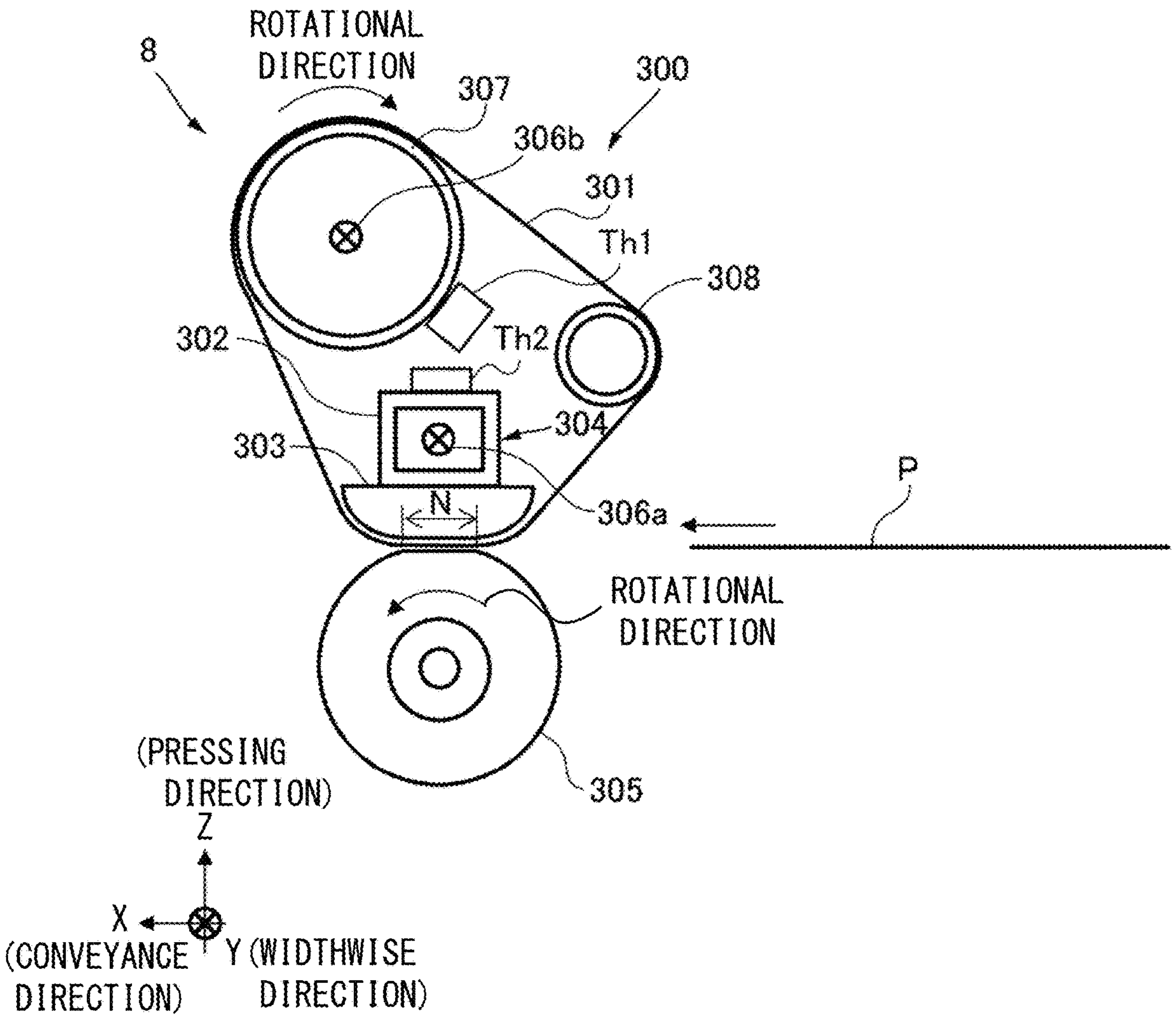
FIG. 2 is a schematic configuration of a sectional view of a fixing device according to the embodiment.

Next, a configuration of the fixing device 8 according to the embodiment will be described by using FIG. 2. FIG. 2 is a sectional view schematically showing the configuration of the fixing device 8. In the embodiment, the belt heating type fixing device with an endless belt is used. In FIG. 2, an X direction indicates a conveying direction of the recording material P, a Y direction indicates a widthwise direction which intersects (perpendicular in the embodiment) the conveying direction of the recording material P and a Z direction indicates a pressing direction of a pressing roller 305 which will be described below. These directions are perpendicular each other. Further, one side in the widthwise direction (Y direction) is a front side of the image forming apparatus 1, and for example, it is a side in which the operation portion 4 is arranged and a user operates. On the other hand, the other side in the widthwise direction is a back side of the image forming apparatus 1.

The fixing device 8 includes a heating unit 300 which includes a fixing belt 301 as a belt member which is endless and rotatable, and the pressing roller 305 as a rotatable member which contacts the fixing belt 301 and forms a nip portion N together with the fixing belt 301.

The heating unit 300 includes the fixing belt 301 which is described above, a fixing pad 303 as a nip portion forming member and a pad member, a stay 302 as a supporting member, a heating roller 307 as a stretching roller and a steering roller 308. Further, the heating unit 300 includes a halogen heater 306*a* and a halogen heater 306*b* which heat the fixing belt 301, and as will be described later, the halogen heater 306*b* as a first heater is arranged inside a heating roller 307 and the halogen heater 306*a* as a second heater is arranged inside the stay 302, respectively. The pressing roller 305 rotates while contacting an outer peripheral surface of the fixing belt 301 and is also a driving rotatable member which applies driving force to the fixing belt 301.

The fixing belt 301 has heat conductivity and heat resistance etc., and is a thin cylindrical shape. In this embodiment, the fixing belt 301 has a three layer structure which is formed with a base layer, an elastic layer which is formed on an outer periphery of the base layer and a mold release layer which is formed on an outer periphery of the elastic layer. And the base layer is 80 μm thick and made of polyimide resin (PI), the elastic layer is 300 μm thick and made of silicone rubber and the mold release layer is 30 μm thick and made of PFA (Tetrafluoroethylene/Perfluoroalkoxyethylene Copolymer Resin) which is a fluorocarbon resin. The fixing belt 301 is stretched by the heating roller 307 as a first stretching member, the steering roller 308 as a stretching member and a stretching unit 304 as a second stretching member. The stretching unit 304 includes the stay 302 and the fixing pad 303.

The fixing pad 303 contacts an inner peripheral surface of the fixing belt 301 and stretches the fixing belt 301. Further, the fixing pad 303 is arranged non-rotatably on an inner side of the fixing belt 301 so as to oppose the pressing roller 305 while nipping the fixing belt 301. The fixing pad 303 forms the nip portion N which nips and conveys the recording material between the fixing belt 301 and the pressing roller 305. In the embodiment, the fixing pad 303 is a substantially plate shape member which is long along a widthwise direction of the fixing belt 301 (a longitudinal direction which intersects the rotational direction of the fixing belt 301 and a rotational axis direction of the heating roller 307). The nip portion N is formed when the fixing pad 303 is pressed against the pressing roller 305 while nipping the fixing belt 301. The fixing pad 303 is made of LCP (Liquid Crystal Polymer) resin. That is, in the embodiment, the fixing pad 303 is made of resin. Incidentally, material of the fixing pad 303 is not limited to LCP, however, it may be other resins or metals.

The fixing pad 303 is supported by the stay 302 as a supporting member which is arranged inside the fixing belt 301. That is, the stay 302, which is configured of the second stretching member together with the fixing pad 303, is arranged on an opposite side of the pressing roller 305 of the fixing pad 303 and supports the fixing pad 303. The stay 302 is a reinforcing member which has rigidity along a longitudinal direction of the fixing belt 301 and which contacts the fixing pad 303 and backs up the fixing pad 303. That is, the stay 302 secures a pressing force at the nip portion N by providing strength to the fixing pad 303, when the fixing pad 303 is pressed by the pressing roller 305. The stay 302 is 3 mm in thickness and made of stainless steel. That is, in the embodiment, the stay 302 is made of metal. However, other metals such as iron and aluminum and resins may be also used.

Further, the stay 302 is a square pipe in which a space along a widthwise direction is formed inside, and the halogen heater 306*a* as the second heater for heating the fixing pad 303 is arranged in the space inside the stay 302 along the widthwise direction. And the stay 302 is capable of heating to a predetermined temperature by the halogen heater 306*a*. The fixing belt 301 is heated by a halogen heater 306*a* arranged inside the stay 302 via the stay 302 and the fixing pad 303.

That is, the halogen heater 306*a* heats the fixing pad 303 via the stay 302. And the fixing belt 301 which is stretched by the fixing pad 303 is heated when the halogen heater 306*a* heats the fixing pad 303. A thermistor Th2 as a temperature detecting portion which detects surface temperature of the stay 302 contacts or is close to an outer surface of the stay 302. The control portion 30 controls energization (temperature control) to the halogen heater 306*a* so that the surface temperature of the stay 302 becomes target temperature (stay target temperature) based on the temperature which is detected by the thermistor Th2.

Incidentally, although the halogen heater 306*a* is shown as one piece in FIG. 2, it may be configured of two or more pieces of the halogen heaters. Further, the heater which heats the fixing pad 303 is not limited to a halogen heater, but may be any other heater which is capable of heating the fixing pad 303 such as a carbon heater.

Between the fixing pad 303 and the fixing belt 301, for example, a sliding member (not shown) such as a lubricating sheet whose surface is coated with PTFE (Poly Tetra Fluoro Ethylene) and silicone oil (hereinafter referred to as "oil") as a lubricant are interposed, so the fixing belt 301 is able to slide smoothly on the fixing pad 303. The sliding member is formed by coating PTFE on a surface of a polyimide base material whose thickness is 70 μm, for example. Incidentally, since the sliding member is arranged to improve sliding property between the fixing pad 303 and the fixing belt 301, it is possible to substitute the sliding member by applying a coating, etc., which improves the sliding property to the surface of the fixing pad 303.

The heating roller 307 as the first stretching member is arranged inside the fixing belt 301, contacts the inner peripheral surface of the fixing belt 301 and stretches the fixing belt 301 together with the fixing pad 303 and the steering roller 308. The heating roller 307 is formed of metal such as aluminum or stainless steel into a cylindrical shape, and the halogen heater 306*b* as the first heater for heating the fixing belt 301 is provided inside the heating roller 307. That is, the halogen heater 306*b* is arranged along the widthwise direction inside the heating roller 307 whose shape is hollow cylinder. And the heating roller 307 is heated to a predetermined temperature by the halogen heater 306*b*.

That is, the halogen heater 306*b* heats the heating roller 307. And the fixing belt 301 which is stretched by the heating roller 307 is heated when the halogen heater 306*b* heats the heating roller 307. A thermistor Th1 as a temperature detecting portion which detects surface temperature of the heating roller 307 contacts or is close to an outer peripheral surface of the heating roller 307. The control portion 30 controls energization (temperature control) to the halogen heater 306*b* so that the surface temperature of the heating roller 307 becomes target temperature (heating roller target temperature) based on the temperature which is detected by the thermistor Th1.

In the embodiment, the heating roller 307 is formed of an aluminum alloy pipe whose thickness is 2 mm, for example. Incidentally, considering temperature rise of an edge portion when the recording material passes through the nip portion, it is desirable that a material whose thermal conductivity is high is used for the heating roller 307, and other metals such as stainless steel alloy may be used other than aluminum alloy. Further, the halogen heater 306*b* may be provided in one piece or multiple pieces. In the embodiment, three pieces of the halogen heaters 306*b* are provided. Incidentally, a heater which heats the heating roller 307 is not limited to a halogen heater, however, it may be other heaters which are capable of heating the heating roller 307 such as a carbon heater. In the embodiment, it is configured that the fixing belt 301 is heated by the halogen heater 306*a* and the halogen heater 306*b*.

The steering roller 308 is arranged inside the fixing belt 301, contacts the inner peripheral surface of the fixing belt 301, stretches the fixing belt 301 together with the fixing pad 303 and the heating roller 307, and is rotationally driven by the fixing belt 301. The steering roller 308 is arranged so as to be inclinable in a direction which is parallel to the rotational axis direction (widthwise direction, longitudinal direction) of the heating roller 307, and it controls a position of the fixing belt 301 (shift position) with respect to the rotational axis by inclining. That is, a rotational center of the steering roller 308 is located at a center portion or one end portion of the steering roller 308 with respect to the rotational axis direction (longitudinal direction), and inclines with respect to the longitudinal direction of the heating roller 307 by swinging around the rotational center. Therefore, a tension difference is generated between one side and the other side of the fixing belt 301 with respect to the longitudinal direction, and the fixing belt 301 is moved in the longitudinal direction.

The fixing belt 301 tends to be shifted toward one of its end portions during rotation depending on an outer diameter accuracy of the stretching rollers, an alignment accuracy between the rollers, etc. Therefore, the steering roller 308 controls the shift. Incidentally, the steering roller 308 may be swung by a driving source such as a motor or may be configured to be swung by automatic alignment.

Further, in the embodiment, the steering roller 308 is urged by a spring which is supported by a frame of the heating unit 300 and is also a tension roller which applies a predetermined tension to the fixing belt 301. Further, the steering roller 308 is formed in a cylindrical shape, which is made of metal such as aluminum or stainless steel. In the embodiment, the steering roller 308 is formed of a stainless steel pipe whose outer diameter is 20 mm. The steering roller 308 may be provided with a rubber material on its surface in order to increase a grip force against the fixing belt 301.

The pressing roller 305 rotates while contacting the outer peripheral surface of the fixing belt 301 and applies driving force to the fixing belt 301. In the embodiment, the pressing roller 305 is a roller in which an elastic layer is formed on an outer periphery of a shaft (core metal) and a mold release layer is formed on an outer periphery of the elastic layer. Further, the shaft is made of stainless steel whose diameter is 44 mm, the elastic layer is made of conductive silicone rubber whose thickness is 8 mm and the mold release layer is made of PFA (Tetrafluoroethylene/Perfluoroalkoxyethylene Copolymer Resin), as fluorocarbon resin, whose thickness is 100 μm, respectively. The pressing roller 305 is rotatably supported by a pressing arm which is movable with respect to a fixing frame (not shown) of the fixing device 8 and a gear is fixed to one end portion of the pressing roller 305, and the pressing roller 305 is connected to a motor (not shown) as a pressing roller driving source via the gear and is rotatably driven.

In the fixing device 8 which is configured as described above, the toner image is heated while the recording material P which bears the toner image is nipped and conveyed in the nip portion N which is formed between the fixing belt 301 and the pressing roller 305. And the toner image is fixed to the recording material P. Therefore, it is necessary for the fixing device 8 to achieve both a function of applying heat and pressure and a function of conveying the recording material P. The pressing roller 305 is pressed against the fixing pad 303 via the fixing belt 301 by a driving source which is not shown. In the embodiment, the pressing pressure (NP) at the nip portion during image forming is set to 1600N, and length of the nip portion N in the X direction (conveying direction) is set to 20 mm and length of the nip portion N in the Y direction (widthwise direction) is set to 350 mm.

[Relationship of Temperature Rising Rate Between the Heating Member and the Fixing Belt]

Here, a relationship of temperature rising rate between the heating member which is heated by the heater and the fixing belt 301 will be described. First, the temperature rising rate of the heating member will be described. As described above, in the stay 302 and the heating roller 307 as the heating members, the halogen heater 306*a* and the halogen heater 306*b* are provided as heaters for heating the fixing belt 301. Here, the temperature rising rate of the heating member is determined by heat capacity of the member which is used and an amount of heat which is supplied from the heater. Specifically, the greater the heat capacity of the heating member, the slower the temperature rising rate, and the greater amount of heat generation of the heater, the faster the temperature rising rate.

Next, the temperature rising rate of the fixing belt 301 will be described. The temperature rising rate of the fixing belt 301 is determined by thermal properties such as thermal conductivity of the heating member and a contact state between the fixing belt 301 and the heating member, in addition to the temperature rising rate of the heating member. Here, the temperature rising rate of the fixing belt 301 when the heating roller 307 is heated by the halogen heater 306*b* is referred to as a first temperature rising rate, and the temperature rising rate of the fixing belt 301 when the stay 302 and the fixing pad 303 are heated by the halogen heater 306*a* is referred to as a second temperature rising rate. In this case, the first temperature rising rate is determined by the heat capacity of the heating roller 307, the heating value of the halogen heater 306*b*, and thermal resistance and contact area between the fixing belt 301 and the heating roller 307. Further, the second temperature rising rate is determined by the heat capacity of the stay 302, the amount of heat generation of the halogen heater 306*a*, the thermal property and the heat conduction property of the fixing pad 303 which is mounted between the fixing belt 301 and the stay 302, the thermal property of the sliding member which is mounted between the fixing pad 303 and the fixing belt 301 and the thermal resistance and the contact area between each of members.

In the configuration of the embodiment, the stay 302 and the heating roller 307 are designed according to heat capacities which are shown in Table 1, and it is designed so that the amount of heat generation of the halogen heater 306*a* is 300 W and the amount of heat generation of the halogen heater 306*b* is 1400 W. That is, in the embodiment, the heat capacity of the heating roller 307 is smaller than that of the stay 302. Since the stretching unit 304 is configured of the stay 302 and the fixing pad 303, obviously, the heat capacity of the stretching unit 304 is larger than that of the heating roller 307.

TABLE 1

| Member | Material | Specific heat capacity [J/g · K] | Density [g/cm$^3$] | Volume [mm$^3$] | Heat capacity [J/K] |
|---|---|---|---|---|---|
| Heating roller | Aluminum | 0.94 | 2.7 | 130000 | 330 |
| Stay | Stainless steel | 0.5 | 7.93 | 109000 | 432 |

Therefore, the temperature rising rate of the heating roller 307 is faster than the temperature rising rate of the stay 302, and the temperature rising rate of the heating roller 307 is faster than the temperature rising rate of the stretching unit 304. Further, the heating roller 307 contacts the fixing belt 301 within a range of 60 mm with respect to the peripheral direction. On the other hand, the stretching unit 304, which is configured of the stay 302 and the fixing pad 303, contacts the recording material P within a range of 20 mm with respect to the conveying direction (X direction) of the recording material P. That is, since the length of the nip portion N in the X direction is 20 mm as described above, a substantial length of the fixing pad 303 which contacts the fixing belt 301 with respect to the peripheral direction of the fixing belt 301 is approximately equal to the length of the nip portion N in the X direction.

Incidentally, the fixing pad 303 may contact the fixing belt 301 even outside the nip portion N, depending on a steering status of the steering roller 308, or at a time when the driving of the pressing roller 205 is started or stopped, etc., however, an area in which the heat of the halogen heater 306*a* is transmitted to the fixing belt 301 via the stay 302 and the fixing belt 301 is mainly the nip portion N, so the length of the stretching unit 304 which contacts the fixing belt 301 with respect to the peripheral direction of the fixing belt 301 is the length of the nip portion N in the embodiment. Further, even when the fixing pad 303 contacts an area other than the nip portion N, the length of the heating roller 307 which contacts the fixing belt 301 with respect to the peripheral direction of the fixing belt 301 is longer than the length of the stretching unit 304 (specifically, the fixing pad 303) which contacts the fixing belt 301.

In this way, the temperature rising rate of the heating roller 307 is faster than the temperature rising rate of the stretching unit 304, and the length of the heating roller 307 which contacts the fixing belt 301 is longer than the length of the stretching unit 304 which contacts the fixing belt 301 with respect to peripheral direction of the fixing belt 301, so the first temperature rising rate (the temperature rising rate of the fixing belt 301 which is heated by the heating roller 307) is faster than the second temperature rising rate (the temperature rising rate of the fixing belt 301 which is heated by the stay 302 and the fixing pad 303). In the configuration of the embodiment, the temperature rising rate of the fixing belt 301 which is heated by the heating roller 307 is approximately 2° C./sec, and the temperature rising rate of the fixing belt 301 which is heated by the stay 302 and the fixing pad 303 is approximately 0.05° C./sec.

Here, a role of each of heating members will be described from a point view of control. The heating roller 307 provides a function of sequentially adjusting the temperature of the fixing belt 301 as a main heating member of the fixing belt 301. On the other hand, the stay 302 and the fixing pad 303 provide functions as supplementary heating members for the fixing belt 301. For example, when the recording material P is thick paper which requires a large amount of heat and the thick paper is continuously passed through the nip portion N during continuous image forming (continuous printing), etc., temperature rising performance of the fixing belt 301 may be insufficient with only the halogen heater 306*b* inside the heating roller 307. In such a case, by heating the stay 302 and the fixing pad 303 with the halogen heater 306*a*, temperatures of the members inside the fixing belt 301 are raised as a whole and maintenance of the temperature of the fixing belt 301 is supported. Therefore, in a case of print types which do not require a large amount of heat, such as fixing the toner image on plain paper or thin paper with a basis weight of 128 g/m$^2$ or less, or image forming small number of sheets, supplementary heating capacity of the fixing belt 301 by the stays 302 and the fixing pads 303 is not necessary, and heating capacity of the fixing belt 301 only by the heating roller 307 may be sufficient.

[Upper Limit of Electric Power which can be Used for the Fixing Device]

In the image forming apparatus according to the embodiment, an upper limit of electric power which can be used for the fixing device 8 changes depending on a situation. For example, electric power which can be used for the image forming apparatus as a whole is 2000 W, and within the range, the upper limit of the electric power which can be used for the fixing device changes between 1400 W and 1700 W depending on the situation. This is because, for example, the electric power which is required for an operation of the image reading portion 2 and an operation of the image forming apparatus main assembly 3 changes between 300 W and 600 W. Here, since the amount of heat generation of the halogen heater 306*a* and the halogen heater 306*b* is designed based on a situation in which it is possible to use 1700 W, a situation in which the upper limit of the electric power is 1400 W may be a situation in which the electric power which can be used for the fixing device 8 is limited. That is, in the embodiment, when each of the halogen heater 306*a* and the halogen heater 306*b* is heated with their maximum amount of heat generation, the electric power of 1700 W is in a situation in which the electric power is not limited. Further, the electric power of 1400 W is the electric power when the halogen heater 306*a* and the halogen heater 306*b* are heated in a situation in which an electric power is lower than the electric power, that is, the electric power is limited.

[Startup Control of Fixing Device]

Next, startup control of the fixing device 8, in the situation in which the electric power is limited and in the situation in which the electric power is not limited as described above, will be described. The startup of the fixing device 8 is an operation that the halogen heater 306*a* and the halogen heater 306*b* of the fixing device 8 are energized by inputting an image forming start signal to the control portion 30, and, at the same time, rotation of the fixing belt 301 is started when the pressing roller 305 is rotationally driven, and it becomes a status in which it is possible to convey the recording material P to the nip portion N (that is, it is possible to start printing).

Figure 3:
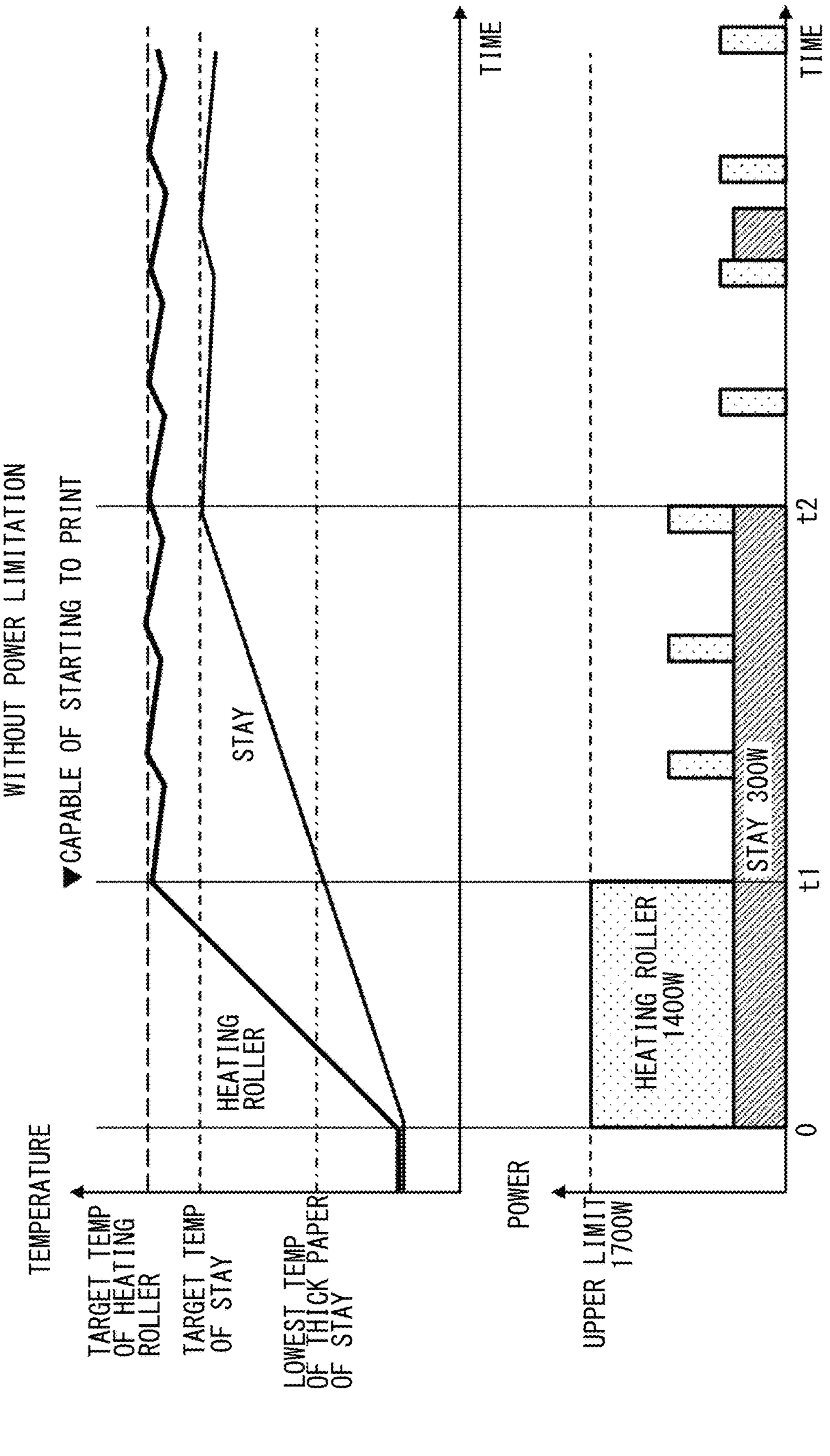
FIG. 3 is a graph showing temperature changes of a heating roller and a stay and power changes of each heater which heats the heating roller and the stay at a startup of the fixing device with no power restriction.

First, transitions of the temperature of the stay 302 and the heating roller 307 and the electric power of the halogen heater 306*a* and the halogen heater 306*b* under the situation in which the electric power which can be used for the fixing device 8 is not limited are shown in FIG. 3. The heating roller 307 and the stay 302 are started to heat simultaneously under the situation in which the electric power is not limited. At this time, a time which is required for the heating roller 307 to reach the target temperature (the heating roller target temperature) is t1, and a time which is required for the stay 302 to reach the target temperature (the stay target temperature) is t2. This is a condition in which the startup time of the fixing device 8 according to the embodiment is the shortest.

Figure 4:
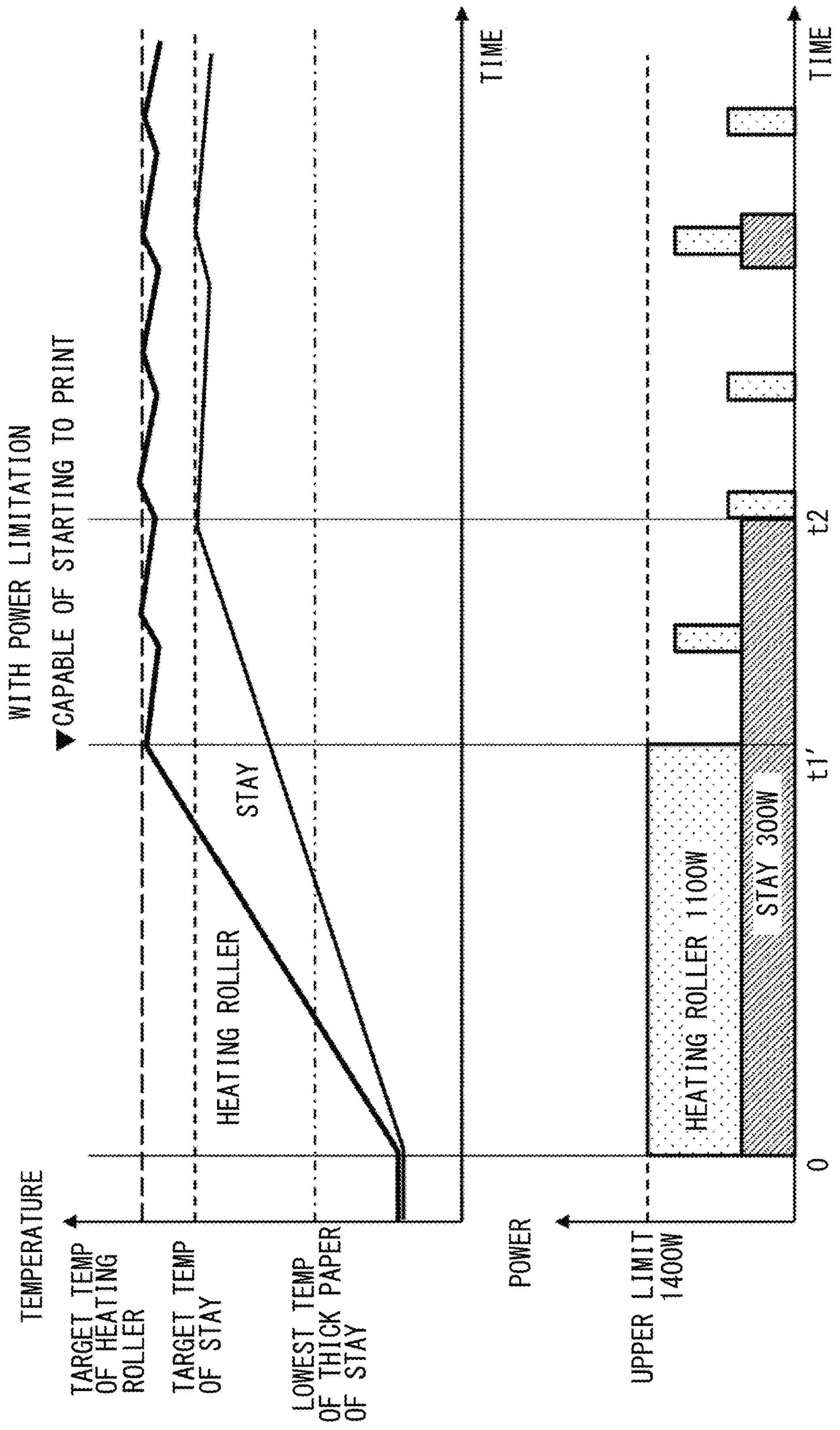
FIG. 4 is a graph showing temperature changes of the heating roller and the stay and power changes of each heater which heats the heating roller and the stay at a startup of the fixing device with power restriction and in a case that heating of each heater which heats the heating roller and the stay is started simultaneously.

Next, transitions of the temperature of the stay 302 and the heating roller 307 and the electric power of the halogen heaters 306*a* and 306*b*, under the situation in which the electric power which can be used for the fixing device 8 is limited and in a case that the embodiment is not applied, are shown in FIG. 4. Here, the heating roller 307 and the stay 302 are heated simultaneously. In this case, the halogen heater 306*b* of heating roller 307 is heated at 1100 W, and the halogen heater 306*a* of the stay 302 is heated at 300 W. A reason why the halogen heater 306*a* of the stay 302 is heated at 300 W is to minimize the time required for both of the stay 302 and the heating roller 307 to reach the target temperature, and the time t2 which is required to reach the target temperature may be longer when the stay 302 whose temperature rising rate is slow is not heated preferentially.

Further, the halogen heater 306*b* is configured of three pieces and it is possible to maintain the temperature of the heating roller 307 at the electric power of 1100 W or less by energizing two pieces of the halogen heater 306*b* after reaching the target temperature. At this time, a time which is required for the heating roller 307 to reach the target temperature is t1', and a time which is required for the stay 302 to reach the target temperature is t2. Here, since time t1' is longer than time t1, in a case that the toner image is fixed on the plain paper or the thin paper with the basis weight is 128 g/m$^2$ or less and in a condition of image forming small number of sheets, etc. as described above, the time which is required to become the status that it is possible to start image forming (it is possible to start printing) is delayed.

Therefore, in the embodiment, at a time of startup of the fixing device 8, the halogen heater 306*b* of the heating roller 307 is started to heat before the halogen heater 306*a* of the stay 302, and the halogen heater 306*a* of the stay 302 is started to heat after the temperature of the heating roller 307 reaches the target temperature. Transitions of the temperature of the stay 302 and the heating roller 307 and the electric power of the halogen heaters 306*a* and 306*b*, under the situation in which the electric power which can be used for the fixing device 8 is limited and in a case that the embodiment is applied, are shown in FIG. 5.

Figure 5:
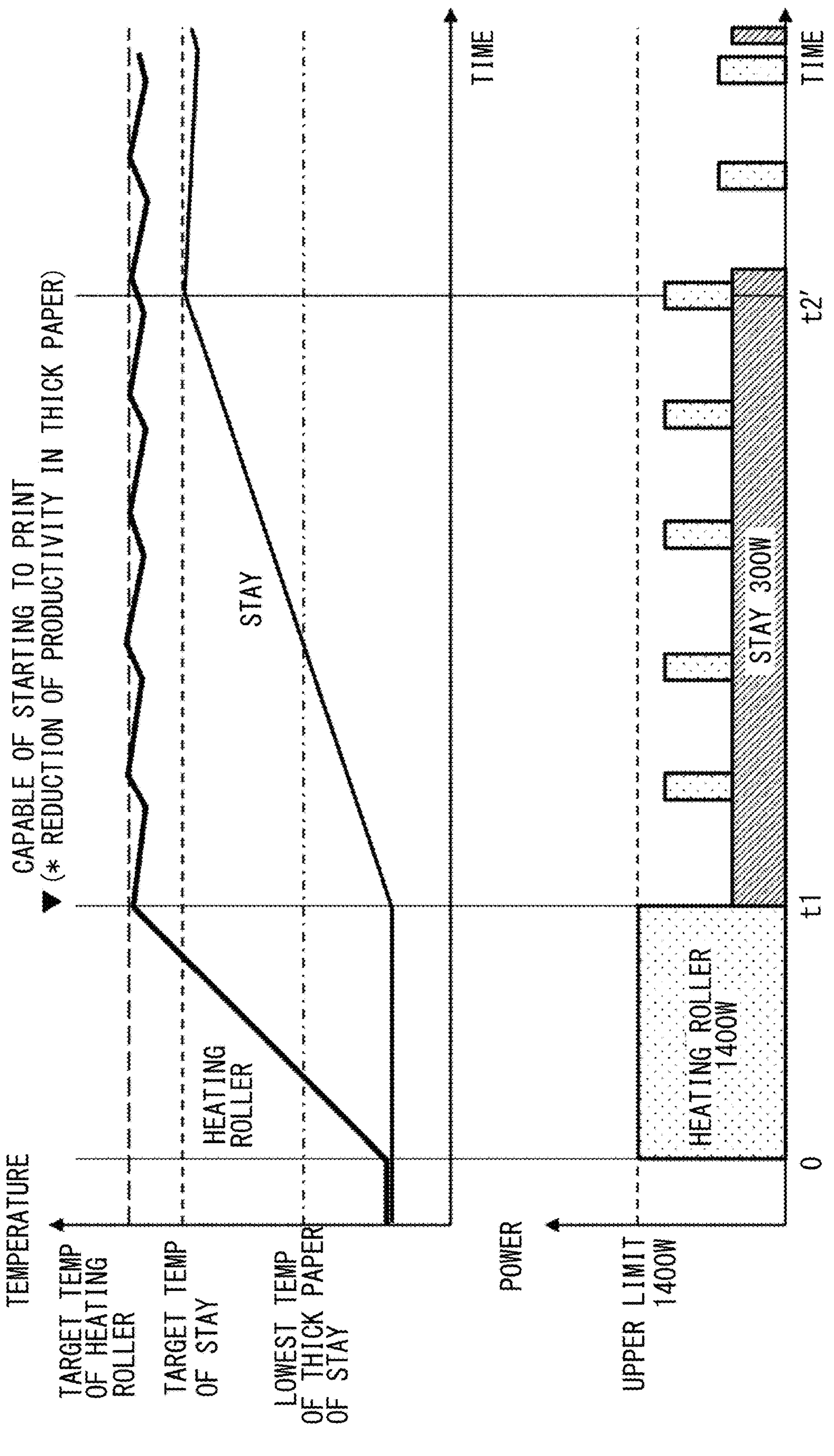
FIG. 5 is a graph showing temperature changes of the heating roller and the stay and power changes of each heater which heats the heating roller and the stay at a startup of the fixing device with power restriction and in a case that a start timing of heating of each heater which heats the heating roller and the stay is shifted.

In FIG. 5, at the time of the startup of the fixing device 8, first of all, the halogen heater 306*b* of the heating roller 307 is started at 1400 W of electric power (a first electric power). That is, the control portion 30 controls a power source 40 (FIG. 7), which will be described below, so as to supply 1400 W of electric power to the halogen heater 306*b* when heating of the halogen heater 306*b* is started. At this time, heating of the halogen heater 306*a* of the stay 302 is not started. Next, when the temperature of the heating roller 307 reaches the target temperature, the heating of the halogen heater 306*a* of the stay 302 is started at 300 W, and an electric power which is supplied to the halogen heater 306*a* of the heating roller 307 is set to an electric power which is lower than 1400 W (a second electric power). That is, when the temperature of the heating roller 307 reaches the target temperature, the control portion 30 controls the power source 40 so as to supply power lower than 1400 W to the halogen heater 306*b*.

Figure 6:
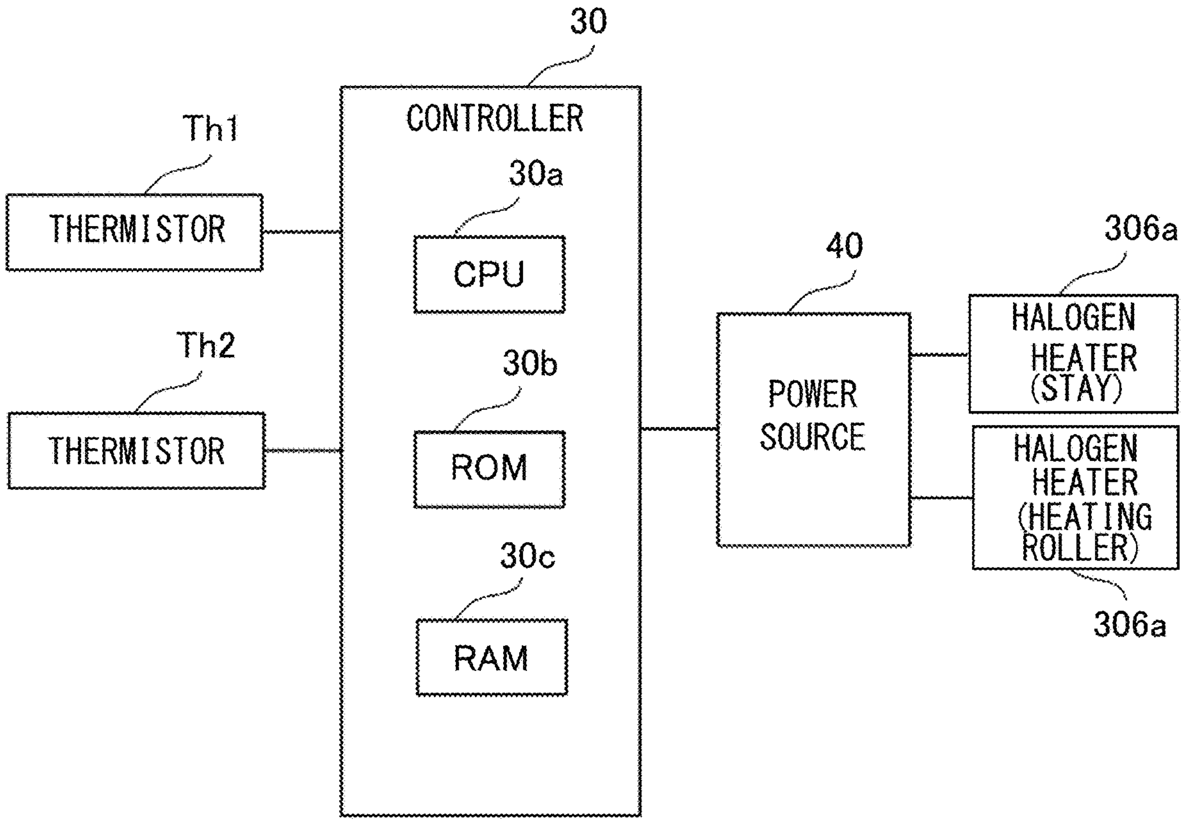
FIG. 6 is a control block diagram showing a part of a control configuration of the image forming apparatus according to the embodiment.

Here, a configuration of a power control of the fixing device 8 according to the present embodiment will be described with reference to FIG. 6. FIG. 6 is a control block diagram showing a part of the control configuration of the image forming apparatus 1 according to the present embodiment. The power source 40 as an electric power supply portion supplies the electric power to the halogen heater 306*a* of the stay 302 and the halogen heater 306*b* of the heating roller 307. The power source 40 is controlled by the control portion 30. In the temperature control of the fixing device 8, the control portion 30 controls the power source 40 based on detected temperatures by the thermistor Th1 and the thermistor Th2, changes electric power supply or lighting ratio of the halogen heater 306*a* and the halogen heater 306*b*, etc. and maintains the temperatures of the heating roller 307 and the stay 302 at the target temperatures.

Further, the control portion 30 is capable of executing a first mode in which the startup of the fixing device 8 is performed in the situation in which the electric power is limited, and a second mode in which the startup of the fixing device 8 is performed in the situation in which the electric power is not limited. That is, the first mode is a mode in which the startup of the fixing device 8 is performed at the electric power lower than the electric power (1400 W in the embodiment) when the halogen heater 306*a* and the halogen heater 306*b* are heated with their maximum amount of heat generation, respectively. The first mode is a mode in which control is performed as shown in FIG. 5 which is described above. The second mode is a mode in which the startup of the fixing device 8 is performed at the electric power (1700 W in the embodiment) when the halogen heater 306*a* and the halogen heater 306*b* are heated with their maximum amount of heat generation, respectively.

The second mode is a mode in which control is performed as shown in FIG. 3 which is described above, and the control portion 30 controls the power source 40 so as to simultaneously start heating the halogen heater 306*b* of the heating roller 307 and heating the halogen heater 306*a* of the stay 302 while the second mode is executed. Incidentally, "simultaneously" as described above also includes slight timing errors such as signal delays and, furthermore, a case that within a predetermined time after heating of one heater is started and while one heater is heating, heating of the other heater is started, in addition to "simultaneously" in an exact meaning. The predetermined time is a time it is possible to be considered that the halogen heater 306*a* and the halogen heater 306*b* are started to heat approximately simultaneously, for example, 0.1 seconds, 1.0 seconds, etc.

Figure 7:
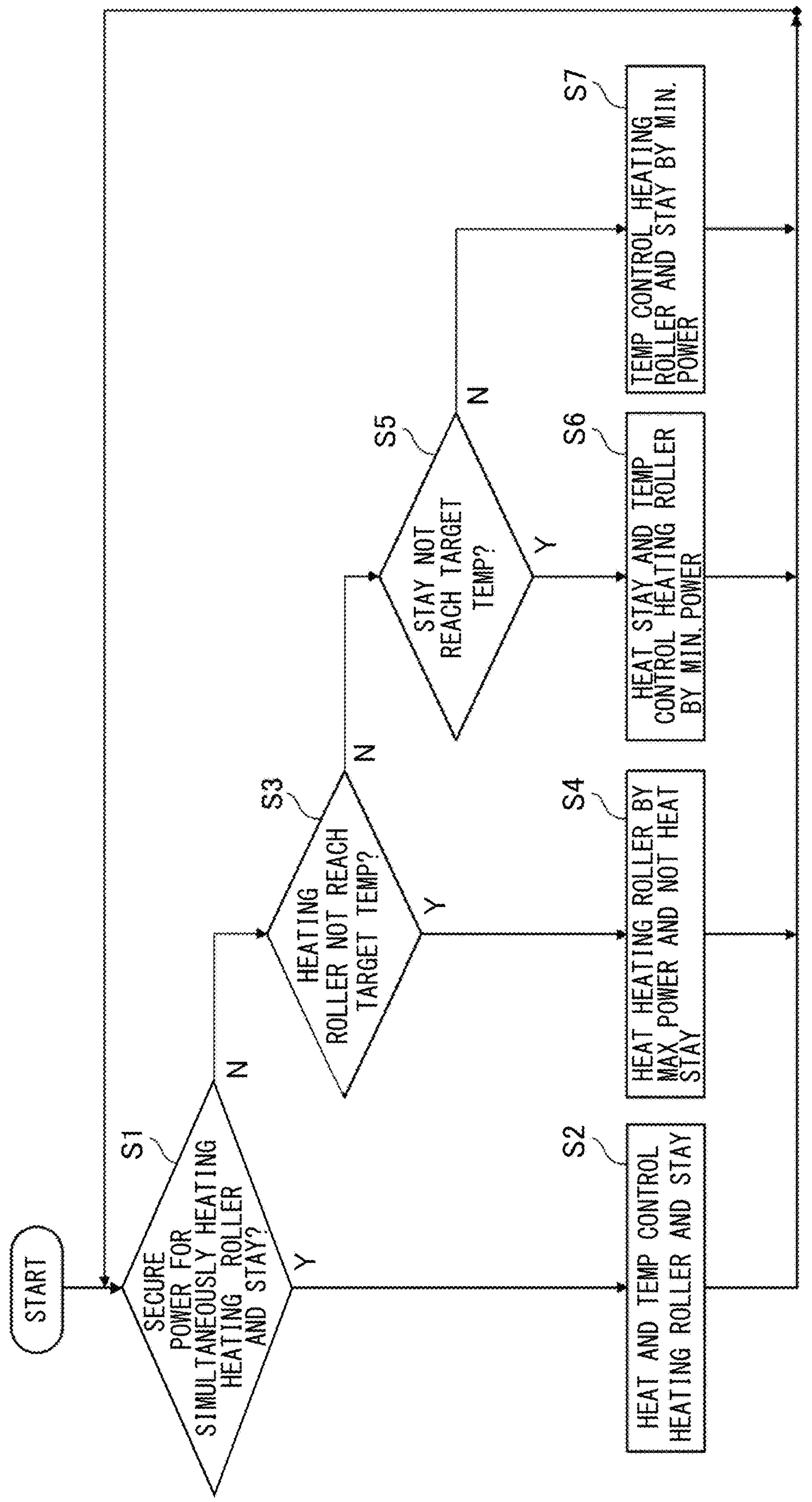
FIG. 7 is a flowchart at a time of starting up the fixing device according to the embodiment.

The startup control of the fixing device 8 according to the embodiment which includes the first mode and the second mode will be described by using a flowchart in FIG. 7 with reference to FIG. 3 and FIG. 5. When the startup operation of the fixing device 8 is started, such that an image forming start signal is input to the control portion 30, etc., the control portion 30 determines whether or not it is possible to secure the electric power in order to heat the heating roller 307 and the stay 302 simultaneously (S1). Specifically, it is determined whether or not it is possible to secure the electric power (1700 W in the embodiment) in the case that the halogen heater 306*a* and the halogen heater 306*b* are heated with their maximum amount of heat generation, respectively. As described above, in the case that the electric power in which it is possible to use for the fixing device 8 is not limited, S1 is "Y", and in the case that the electric power in which it is possible to use for the fixing device 8 is limited, S1 is "N". In a case that S1 is "Y", the control portion 30 executes the second mode, and as shown in FIG. 3, the halogen heater 306*a* and the halogen heater 306*b* start to heat simultaneously and the temperature of the heating roller 307 and the stay 302 is controlled (S2).

In a case that S1 is "N", that is, in a case that the electric power which is possible to use for the fixing device 8 is limited to 1400 W and it is not possible to secure the electric power of 1700 W, the control portion 30 executes the first mode and determines whether or not the heating roller 307 reaches the target temperature (S3). In an initial state, since the heating roller 307 is not reached at the target temperature ("Y" in S3), the control portion 30 starts heating of the halogen heater 306*b* of the heating roller 307 at 1400 W (the first electric power) as shown in FIG. 5, and does not heat the halogen heater 306*a* of the stay 302 (S4).

S4 is continued to be executed until the heating roller 307 is reached at the target temperature, and when the heating roller 307 is reached at the target temperature ("N" in S3, after time t1 in FIG. 5), the control portion 30 determines whether or not the stay 302 is reached at the target temperature (S5). In the initial state, since the stay 302 is not reached at the target temperature ("Y" in S5), the control portion 30 starts heating of the halogen heater 306*a* of the stay 302 and controls the temperature of the halogen heater 306*b* of the heating roller 307 with a minimum electric power (S6).

Here, the minimum electric power of the halogen heater 306*b* is lower electric power (the second electric power) than 1400 W as the first electric power and is the electric power which is able to maintain the temperature of the heating roller 307. Further, the minimum electric power of the halogen heater 306*b* is, as shown in FIG. 5, the electric power which is less than the upper limit electric power due to the electric power limitation (1400 W in the embodiment), even when the electric power in a case that the halogen heater 306*a* of the stay 302 is heated at the maximum amount of the heat generation (300 W in the embodiment) is added. In the embodiment, in a case that the halogen heater 306*b* is heated with the minimum power, the lighting ratio of the halogen heater 306*b* is set to be lower than the lighting ratio during a period from the start of heating of the halogen heater 306*b* until the heating roller 307 reaches the target temperature (while heating with the electric power of 1400 W). For example, during the period from the start of heating of the halogen heater 306*b* until the heating roller 307 reaches the target temperature, the lighting ratio is set to 100%, and after the heating roller 307 reaches the target temperature, the lighting ratio is changed in a range which is less than 100% in accordance with the detected temperature by the thermistor Th1.

S6 continues to be executed until the stay 302 reaches the target temperature, and when the stay 302 reaches the target temperature ("N" in S5, after time t2' in FIG. 5), the control portion 30 controls the temperature of the halogen heater 306*b* of the heating roller 307 and the halogen heater 306*a* of the stay 302 with the minimum electric power (S7). Here, the minimum electric power of the halogen heater 306*a* is lower than the electric power which is required during a period from the start of heating of the halogen heater 306*a* until the stay 302 reaches the target temperature, and it is able to maintain the temperature of the stay 302. In the embodiment, in a case that the halogen heater 306*a* is heated with the minimum power, the lighting ratio of the halogen heater 306*a* is set to be lower than the lighting ratio during a period from the start of heating of the halogen heater 306*a* until the stay 302 reaches the target temperature (while heating with the electric power of 300 W). For example, during the period from the start of heating of the halogen heater 306*a* until the stay 302 reaches the target temperature, the lighting ratio is set to 100%, and after the stay 302 reaches the target temperature, the lighting ratio is changed in a range which is less than 100% in accordance with the detected temperature by the thermistor Th2.

In the embodiment as described above, even when the electric power is limited, it is possible to suppress lengthening the time from starting of the startup of the fixing device 8 until image forming is started. That is, in the first mode, during the startup operation of the fixing device 8, the halogen heater 306*b* of the heating roller 307 is heated with the electric power of 1400 W, and the halogen heater 306*a* of the stay 302 is not heated. In this case, as shown in FIG. 5, a time which is required for the heating roller 307 to reach the target temperature is t1, and a time which is required for the stay 302 to reach the target temperature is t2'. Here, the time t2' which is required for the stay 302 to reach the target temperature is longer than the time t2 which is shown in FIG. 4, however, the time t1 in which it is possible to start image forming (it is possible to start printing) is not changed, compared to the case of FIG. 3 in which the electric power is not limited. This is because, in the configuration according to the embodiment, as described above, heating of the stay 302 is not always necessary depending on the print types. As a result of reviewing the configuration, t1 is approximately 90 seconds and t1' is approximately 140 seconds, so it is possible to reduce approximately 50 seconds for the startup time.

Incidentally, under a condition of the embodiment, the time, which is required from startup until it is possible to start printing, becomes short, however, the stay 302 is not heated, so it may be difficult to maintain the temperature of the fixing belt 301 in a case that thick paper, which requires a large amount of the electric power, is continuously image formed (printed). That is, as shown in FIG. 3 through FIG. 5, the temperature of the stay 302 may not reach the temperature at which it is possible to print thick paper continuously (minimum temperature of stay for thick paper). In this case, in order to restore the temperature of the fixing belt 301 from a middle of continuous image forming, image forming interval is extended, or a standby of the image forming operation (print standby) is performed until the temperature of the stay 302 rises to a predetermined temperature or higher when the number of continuous image forming sheets of thick paper is set to be more than a specified number, etc., it is possible to cope with it by reducing productivity.

OTHER EMBODIMENTS

In the embodiment which is described above, in the configuration in which the nip portion N is formed by the fixing pad 303 as well as the stay 302 and the pressing roller 305 via the fixing belt 301, a configuration in which the halogen heater 306*a* is arranged in the stay 302 and the halogen heater 306*b* is arranged in the heating roller 307 is described. However, the configuration, in which the nip portion N is formed, is not limited to the fixing pad 303 and the stay 302, however, the nip portion N may be formed by a roller member, etc. In this case, the roller member corresponds to a second stretching member, and a second heater, such as a halogen heater, is arranged inside the roller member.

Further, a heating method of the stretching member is not limited to the configuration of the halogen heater 306*a* in the stay 302 and the halogen heater 306*b* in the heating roller 307, however, it may also be other means such as using an electromagnetic induction method or using a ceramic heater. Further, the plurality of stretching members which are heated by heaters respectively may be configured of not only two members but also three or more members. For example, a heater may also be provided inside the steering roller 308. Further, in the embodiment which is described above, the configuration that the plurality of stretching members, each of which is heated by a heater, are arranged inside the belt member and heat the belt member by contacting the inner peripheral surface of the belt member, is described. However, it may be also a configuration that a stretching member which includes a heater for heating the belt member is arranged on an outside of the belt member and heats the belt member by contacting an outer peripheral surface of the belt member. That is, the stretching member may be configured to contact the inner peripheral surface or the outer peripheral surface of the belt member.

Further, in the description above, an example is provided, in which print standby is performed until the temperature of the stay 302 rises above the predetermined temperature when the number of continuous image forming sheets (number of prints) of thick paper is set to exceed the specified number, in a case of printing thick paper whose basis weight exceeds 128 $g/m^2$ while the stay 302 has not reached the target temperature. However, in a case of printing thick paper whose basis weight exceeds 128 $g/m^2$ while the stay 302 has not reached the target temperature, it may cope with it by extending a print interval immediately after starting printing.

Further, in the embodiment which is described above, the heat capacities of two of the stretching members which are heated by the heaters are different, however, the heat capacities of two of the stretching members may be same, for example. In this case, it is possible to apply the present invention in a case that one of the stretching members heats the belt member at a faster rate due to a difference in an amount of heat generation of the heaters or a difference in a contact length with the belt member. Furthermore, a relationship between the heat capacities of two of stretching members may be reversed from the embodiment which is described above. In this case, it is possible to apply the present invention in a case that the temperature rising rate of the belt member by the stretching member whose heat capacity is large is faster than the temperature rising rate of the belt member by the stretching member whose heat capacity is small, since the amount of heat generation of the heater is larger or the contact length with the belt member is longer in the stretching member whose heat capacity is greater, etc. In either case, in the first mode, when the heater which heats the stretching member whose temperature rising rate is faster (the first stretching member) is defined as the first heater and the heater which heats the stretching member whose temperature rising rate is slower (the second stretching member) is defined as the second heater, heating of the first heater is started before heating of the second heater, and heating of the second heater is started after the temperature of the first stretching member has reached the target temperature during the startup of the fixing device.

Further, in the embodiment which is described above, a configuration, which uses a pressing roller as a rotatable member, is described. However, the rotatable member may be an endless belt which is stretched by a plurality of stretching rollers and driven by any of the stretching rollers. Further, in each of embodiments which are described above, the pressing roller as the rotatable member is pressed against the belt in order to form the nip portion, however, it may be a configuration in which the belt is pressed against the rotatable member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-094067 filed on Jun. 11, 2024, which is hereby incorporated by reference herein in its entirety.

What is claimed is:

1. A fixing device for heating a toner image born on a recording material and fixing to the recording material, the fixing device comprising:

an endless belt member;

a rotatable member configured to form a nip portion, between itself and the belt member, for nipping and conveying the recording material in contact with an outer peripheral surface of the belt member;

a first stretching member in contact with an inner peripheral surface or the outer peripheral surface of the belt member and configured to stretch the belt member;

a first heater configured to heat the first stretching member;

a second stretching member in contact with the inner peripheral surface or the outer peripheral surface of the belt member and configured to stretch the belt member; and a second heater configured to heat the second stretching member, wherein an amount of heat generation of the first heater is larger than an amount of heat generation of the second heater, and wherein at a start up of the fixing device, heating of the first heater is started by a first electric power prior to heating of the second heater, and the heating of the second heater is started by a second electric power smaller than the first electric power after a temperature of the first stretching member reaches a target temperature.

2. The fixing device according to claim 1, wherein a heat capacity of the first stretching member is smaller than a heat capacity of the second stretching member.

3. The fixing device according to claim 1, wherein with respect to a circumferential direction of the belt member, a length with which the first stretching member is in contact with the belt member is longer than a length with which the second stretching member is in contact with the belt member.

4. The fixing device according to claim 1, wherein the first stretching member is a heating roller disposed inside the belt member, and wherein the first heater is disposed inside the heating roller.

5. The fixing device according to claim 1, wherein the second heater is heated by a third electric power, and wherein a total of the second electric power and the third electric power is equal to or below the first electric power.

6. The fixing device according to claim 1, wherein the second stretching member includes a pad member disposed inside the belt member so as to nip the belt member between itself and the rotatable member and configured to form the nip portion between the belt member and the rotatable member, and a supporting member disposed on a side opposite to the rotatable member with respect to the pad member, configured to support the pad member and inside which a space is formed, and wherein the second heater is disposed inside the supporting member.

7. A fixing device for heating a toner image born on a recording material and fixing to the recording material, the fixing device comprising:

an endless belt member;

a rotatable member configured to form a nip portion, between itself and the belt member, for nipping and conveying the recording material in contact with an outer peripheral surface of the belt member;

a first stretching member in contact with an inner peripheral surface or the outer peripheral surface of the belt member and configured to stretch the belt member;

a first heater configured to heat the first stretching member;

a second stretching member in contact with the inner peripheral surface or the outer peripheral surface of the belt member and configured to stretch the belt member; and a second heater configured to heat the second stretching member, wherein when a speed at which a temperature of the belt member is raised by heating the first stretching member by the first heater is defined as a first temperature rising speed and a speed at which a temperature of the belt member is raised by heating the second stretching member by the second heater is defined as a second temperature rising speed, the first temperature rising speed is faster than the second rising temperature speed, and wherein at a start up of the fixing device, heating of the first heater is started prior to heating of the second heater, and the heating of the second heater is started after a temperature of the first stretching member reaches a target temperature.

8. An image forming apparatus comprising:

an image forming portion configured to form a toner image on a recording material;

a fixing device configured to heat the recording material on which the toner image is formed by the image forming portion and to fix the toner image onto the recording material;

an electric power supplying portion; and a control portion configured to control the electric power supplying portion, wherein the fixing device comprising:

an endless belt member;

a rotatable member configured to form a nip portion, between itself and the belt member, for nipping and conveying the recording material in contact with an outer peripheral surface of the belt member;

a first stretching member in contact with an inner peripheral surface or the outer peripheral surface of the belt member and configured to stretch the belt member;

a first heater configured to heat the first stretching member;

a second stretching member in contact with the inner peripheral surface or the outer peripheral surface of the belt member and configured to stretch the belt member; and a second heater configured to heat the second stretching member, wherein a heat capacity of the first stretching member is smaller than a heat capacity of the second stretching member;

wherein the electric power supplying portion supplies the electric power to the first heater and the second heater, and wherein the control portion is capable of executing an operation in a mode in which a start up of the fixing device is performed by an electric power lower than a electric power at a time of heating the first heater and the second heater with the maximum amount of heat generation, respectively, and during executing the operation in the mode, controls the electric power supplying portion so as to start heating the first heater prior to heating the second heater, and to start heating the second heater after a temperature of the first stretching member reaches a target temperature.

9. The image forming apparatus according to claim 8, wherein during executing the operation in the mode, the control portion controls the electric power supplying portion so as to supply a first electric power to the first heater at a start of heating of the first heater and to supply a second electric power lower than the first electric power to the first heater when the temperature of the first stretching member reaches the target temperature.

10. The image forming apparatus according to claim 8, wherein the mode is a first mode, and wherein the control portion is capable of executing an operation in a second mode in which the start up of the fixing device is performed by an electric power which is an electric power at a time of heating the first heater and the second heater with the maximum amount of heat generation, respectively, and during executing the operation in the second mode, controls the electric power supplying portion so as to simultaneously start heating the first heater and the second heater.

11. The image forming apparatus according to claim 8, wherein an amount of heat generation of the first heater is larger than an amount of heat generation of the second heater.

12. The image forming apparatus according to claim 8, wherein with respect to a circumferential direction of the belt member, a length with which the first stretching member is in contact with the belt member is longer than a length with which the second stretching member is in contact with the belt member.

13. The image forming apparatus according to claim 8, wherein the first stretching member is a heating roller disposed inside the belt member, and wherein the first heater is disposed inside the heating roller.

14. The image forming apparatus according to claim 8, wherein the second stretching member includes a pad member disposed inside the belt member so as to nip the belt member between itself and the rotatable member and configured to form the nip portion between the belt member and the rotatable member, and a supporting member disposed on a side opposite to the rotatable member with respect to the pad member, configured to support the pad member and inside which a space is formed, and wherein the second heater is disposed inside the supporting member.

15. An image forming apparatus comprising:

an image forming portion configured to form a toner image on a recording material;

a fixing device configured to heat the recording material on which the toner image is formed by the image forming portion and to fix the toner image onto the recording material;

an electric power supplying portion; and a control portion configured to control the electric power supplying portion, wherein the fixing device comprising:

an endless belt member;

a rotatable member configured to form a nip portion, between itself and the belt member, for nipping and conveying the recording material in contact with an outer peripheral surface of the belt member;

a first stretching member in contact with an inner peripheral surface or the outer peripheral surface of the belt member and configured to stretch the belt member;

a first heater configured to heat the first stretching member;

a second stretching member in contact with the inner peripheral surface or the outer peripheral surface of the belt member and configured to stretch the belt member; and a second heater configured to heat the second stretching member, wherein when a speed at which a temperature of the belt member is raised by heating the first stretching member by the first heater is defined as a first temperature rising speed and a speed at which a temperature of the belt member is raised by heating the second stretching member by the second heater is defined as a second temperature rising speed, the first temperature rising speed is faster than the second temperature rising speed;

wherein the electric power supplying portion supplies the electric power to the first heater and the second heater, and wherein the control portion is capable of executing an operation in a mode in which a start up of the fixing device is performed by an electric power lower than a electric power at a time of heating the first heater and the second heater by the maximum amount of heat generation, respectively, and during executing the operation in the mode, controls the electric power supplying portion so as to start heating the first heater prior to heating the second heater, and to start heating the second heater after a temperature of the first stretching member reaches a target temperature.

* * * * *